(12) United States Patent
Maiyuran et al.

(10) Patent No.: US 6,735,712 B1
(45) Date of Patent: May 11, 2004

(54) DYNAMICALLY CONFIGURABLE CLOCKING SCHEME FOR DEMAND BASED RESOURCE SHARING WITH MULTIPLE CLOCK CROSSING DOMAINS

(75) Inventors: Subramaniam Maiyuran, Gold River, CA (US); Lokpraveen B. Mosur, Rancho Cordova, CA (US); Salvador Palanca, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 604 days.

(21) Appl. No.: 09/657,559

(22) Filed: Sep. 8, 2000

(51) Int. Cl.[7] .................................................. G06F 1/04
(52) U.S. Cl. ........................ 713/501; 713/400; 713/600
(58) Field of Search ................................ 713/400, 401, 713/500, 501, 502, 503, 600, 601

(56) References Cited

U.S. PATENT DOCUMENTS

| | | | |
|---|---|---|---|
| 5,448,715 A | * | 9/1995 | Lelm et al. ................. 713/600 |
| 5,818,464 A | | 10/1998 | Wade |
| 5,854,637 A | | 12/1998 | Sturges |
| 5,999,197 A | * | 12/1999 | Satoh et al. ................. 345/567 |
| 6,189,076 B1 | * | 2/2001 | Fadavi-Ardekani et al. 711/147 |
| 6,222,564 B1 | | 4/2001 | Sturges |
| 6,327,667 B1 | * | 12/2001 | Hetherington et al. ...... 713/500 |
| 6,401,176 B1 | * | 6/2002 | Fadavi-Ardekani et al. 711/151 |

* cited by examiner

Primary Examiner—Dennis M. Butler
(74) Attorney, Agent, or Firm—Blakely, Sokoloff, Taylor & Zafman LLP

(57) ABSTRACT

A first clock signal having a first frequency is applied to drive a first module. A second clock signal having a second frequency is applied to drive a second module. The second frequency is different from the first frequency. A third clock signal is selectively applied with a frequency substantially the same as the first frequency to drive at least one portion of a resource to allow the first module to access the one portion of the resource. The third clock signal is selectively applied with a frequency substantially the same as the second frequency to drive at least the one portion of the resource to allow the second module to access the one portion of the resource.

28 Claims, 9 Drawing Sheets

DYNAMICALLY CONFIGURABLE CLOCKING SCHEME FOR DEMAND BASED RESOURCE SHARING WITH MULTIPLE CLOCK CROSSING DOMAINS

BACKGROUND OF THE INVENTION

1. Field of the Invention

The present invention relates generally to the field of resource sharing for computer systems. More particularly, the present invention relates to the field of resource sharing between or among two or more modules driven at different clock frequencies.

2. Description of Related Art

FIG. 1 illustrates an integrated circuit chip 10 comprising a module 12, a module 14, and a resource 20. Modules 12 and 14 share access to resource 20. Module 12 and resource 20 are driven by a clock signal 32 input to module 12 and to resource 20. Module 14 is driven by a clock signal 34 input to module 14. Clock signals 32 and 34 have different frequencies. Modules 12 and 14 cannot access resource 20 simultaneously.

Because module 14 and resource 20 are driven at different clock frequencies, module 14 accesses resource 20 using clock crossing circuitry 70. Clock crossing circuitry 70 helps manage the cross-over of data and control signals, for example, generated at one clock frequency and received at a different clock frequency. As module 12 and resource 20 are driven at substantially the same clock frequency, module 12 does not require clock crossing circuitry to access resource 20 as module 14 does.

Clock crossing circuitry 70 typically comprises a buffer in which data signals, for example, are input at one clock frequency and output at a different clock frequency. Clock crossing circuitry 70 may alternatively manage a direct asynchronous transfer of data signals, for example, between resource 20 and module 14 in response to handshaking signals generated between module 14 and resource 20 in accordance with a suitable asynchronous transfer protocol.

Clock crossing circuitry 70 is typically implemented to manage clock frequency cross-overs at only one or few clock ratios P/Q, where P/Q corresponds to the ratio of the frequency of clock signal 32 to the frequency of clock signal 34. Such clock crossing circuitry 70, however, limits the frequencies at which clock signals 32 and 34 may be generated. The ability to dial in frequencies independently for each module 12 and 14 is desirable to allow integrated circuit chip 10 to cover different market segments and to facilitate different frequency bins for integrated circuit chip 10. Constraints on the frequencies at which clock signals 32 and 34 may be generated may also mean module 12 and/or module 14 may not be driven at relatively higher frequencies. Although clock crossing circuitry 70 may be implemented to manage many more clock ratios P/Q, such clock crossing circuitry 70 is typically more costly and more complex to implement on silicon and typically increases die size.

Clock crossing circuitry 70 also reduces performance of integrated circuit chip 10 due to the increase in the latency of transactions crossing multiple clock domains. Incorporating high skew and jitter parameters into clock crossing circuitry 70 further complicates its implementation. The logic complexity of the bus crossing clock crossing circuitry 70 also increases the pre-silicon and post-silicon logic design validation effort.

Furthermore, module 14 cannot access resource 20 if clock signal 32 ceases, for example, when module 12 enters an internal power down or sleep mode.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description sets forth an embodiment or embodiments in accordance with the present invention for a dynamically configurable clocking scheme for demand based resource sharing with multiple clock crossing domains. In the following description, details are set forth such as specific circuit configurations, etc., in order to provide a thorough understanding of the present invention. It will be evident, however, that the present invention may be practiced without these details. In other instances, well-known circuit components, etc., have not been described in particular detail so as not to obscure the present invention.

Figure 2:
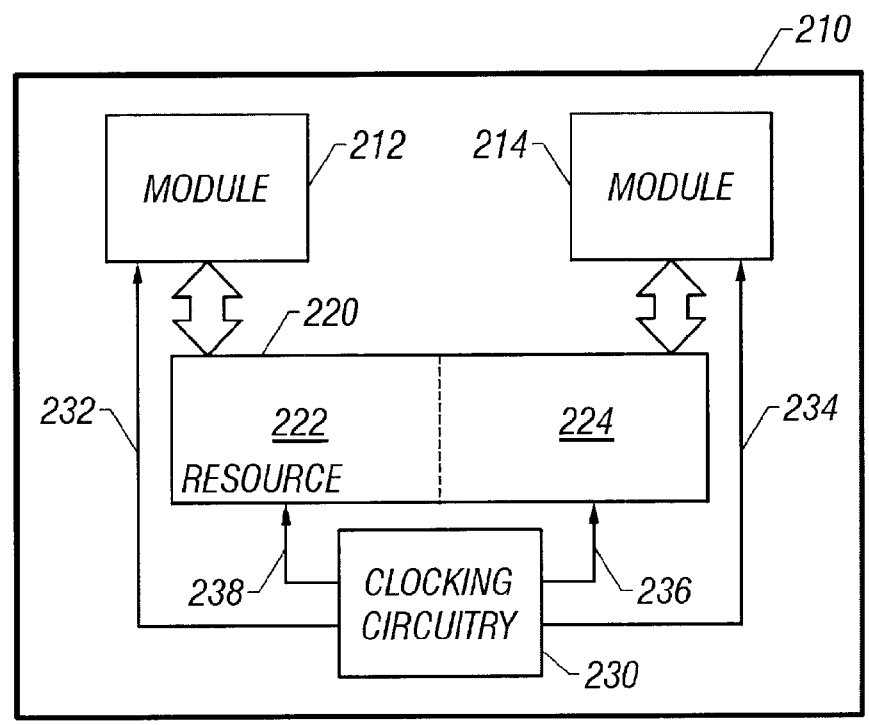
FIG. 2 illustrates, for one embodiment, an integrated circuit chip in which a resource is shared between a first module and a second module.

FIG. 2 illustrates an integrated circuit chip 210 comprising a first module 212, a second module 214, a resource 220, and clocking circuitry 230. Modules 212 and 214 are each coupled to resource 220. Clocking circuitry 230 is coupled to modules 212 and 214 and to resource 220.

Modules 212 and 214 share access to at least a portion of resource 220. Resource 220 may be apportioned, if at all, into any suitable number of portions of any suitable size or fraction of resource 220. For one embodiment, as illustrated in FIG. 2, resource 220 comprises a first portion 222 and a second shared portion 224, and modules 212 and 214 share access to shared portion 224. Clocking circuitry 230 drives modules 212 and 214 and resource 220.

Figure 3:
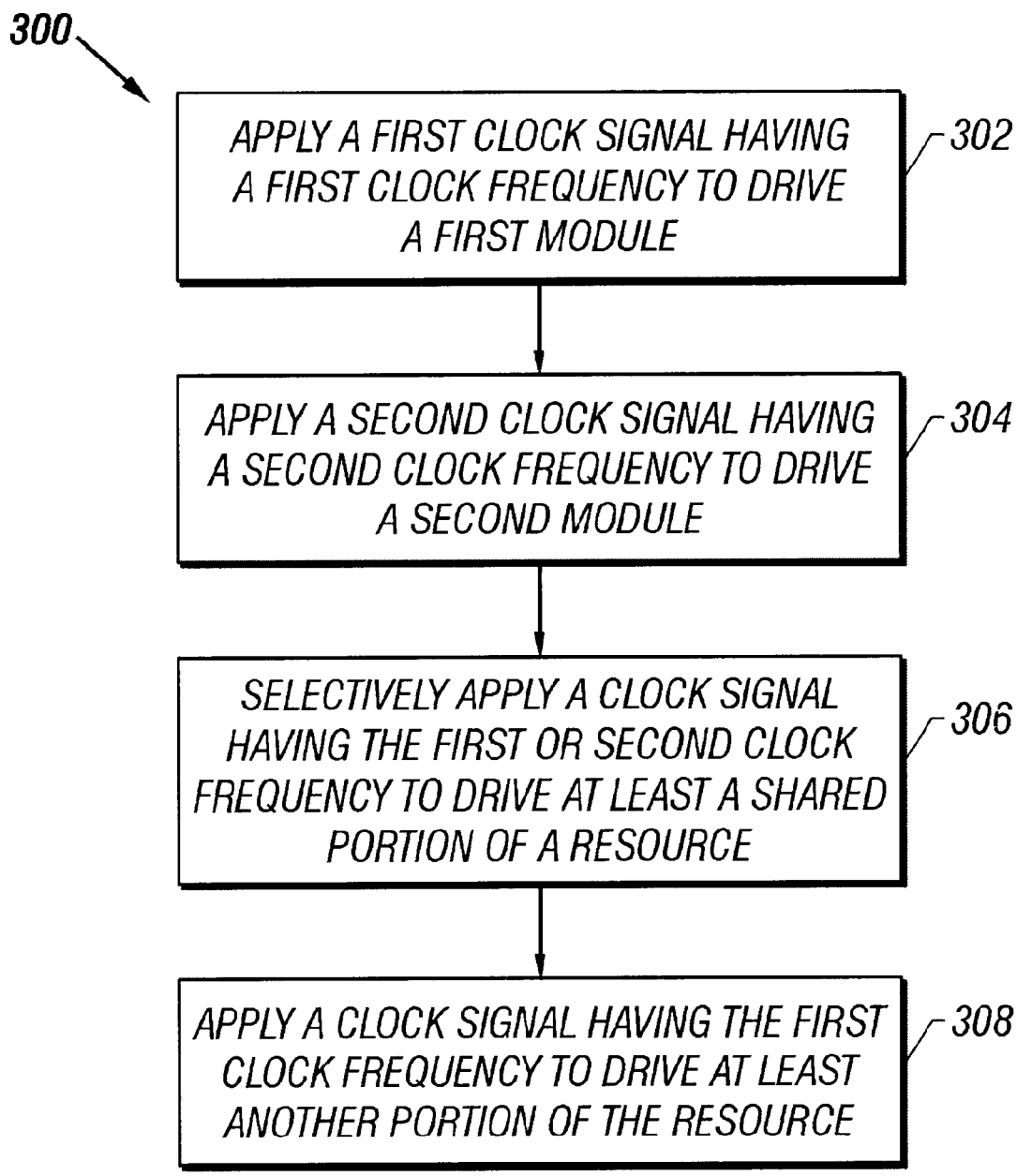
FIG. 3 illustrates, for one embodiment, a flow diagram to share a resource.

Clocking circuitry 230 for one embodiment drives modules 212 and 214 and resource 220 in accordance with flow diagram 300 of FIG. 3.

For block 302 of FIG. 3, clocking circuitry 230 applies a clock signal 232 having a first clock frequency to module 212 to drive module 212. For block 304, clocking circuitry 230 applies a clock signal 234 having a second clock frequency to module 214 to drive module 214. The frequency of clock signal 232 for one embodiment is different from the frequency of clock signal 234.

For block 306, clocking circuitry 230 applies a clock signal 236 to drive at least shared portion 224 of resource 220 to allow either module 212 or module 214 to access shared portion 224 of resource 220. In applying clock signal 236, clocking circuitry 230 for one embodiment selectively applies clock signal 236 having substantially the same frequency as clock signal 232 or clock signal 234. Clocking circuitry 230 for one embodiment selectively applies clock signal 232 or clock signal 234 as clock signal 236. Clocking circuitry 230 selectively applies clock signal 236 with substantially the same frequency as clock signal 232 to drive at least shared portion 224 of resource 220 to allow module 212 to access shared portion 224 of resource 220. Clocking circuitry 230 selectively applies clock signal 236 with substantially the same frequency as clock signal 234 to drive at least shared portion 224 of resource 220 to allow module 214 to access shared portion 224 of resource 220.

Figure 1:
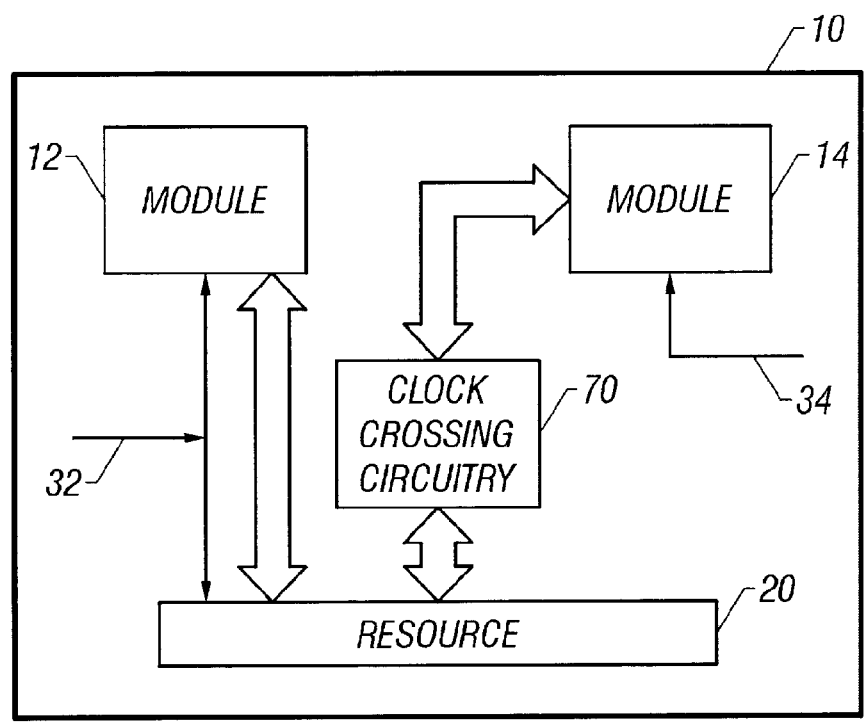
FIG. 1 illustrates a prior art integrated circuit chip in which a resource is shared.

Because clocking circuitry 230 selectively drives shared portion 224 at substantially the same clock frequency as module 212 or module 214, both module 212 and module 214 may access shared portion 224 without any clock crossing circuitry as otherwise required, for example, in integrated circuit chip 10 of FIG. 1. Clocking circuitry 230 also allows frequencies to be independently dialed in for each module 212 and 214 without concern of frequency constraints imposed by clock crossing circuitry, allowing integrated circuit chip 210 to cover different market segments and facilitating different frequency bins for integrated circuit chip 210. Module 212 and module 214 may also be driven at relatively higher frequencies.

Also, unlike integrated circuit chip 10 of FIG. 1, clocking circuitry 230 allows dedicated access to shared portion 224 by module 212 by applying clock signal 236 with substantially the same frequency as clock signal 232 to shared portion 224. Clocking circuitry 230 also allows dedicated access to shared portion 224 by module 214 by applying clock signal 236 with substantially the same frequency as clock signal 234 to shared portion 224. By selectively applying clock signal 236 with either one of such frequencies, clocking circuitry 230 allows such dedicated access to be dynamically switched between module 212 and module 214.

For one embodiment, as illustrated in FIG. 2, where resource 220 comprises at least another portion 222 in addition to shared portion 224, clocking circuitry 230 for block 308 of FIG. 3 applies a clock signal 238 having substantially the same frequency as clock signal 232 to drive at least portion 222 of resource 220 to allow module 212 to access portion 222. Clocking circuitry 230 for one embodiment applies clock signal 232 as clock signal 238.

Clocking circuitry 230 for one embodiment applies clock signal 238 to drive at least portion 222 of resource 220 while applying clock signal 236 to drive at least shared portion 224 of resource 220. In this manner, module 212 may simultaneously access portion 222 of resource 220 while also accessing shared portion 224. Also, module 212 may simultaneously access portion 222 of resource 220 while module 214 accesses shared portion 224.

Clocking circuitry 230 for one embodiment allows shared portion 224 of resource 220 to be accessed by module 214 despite halting clock signal 232. Clocking circuitry 230 may halt clock signal 232, for example, when module 212 enters an internal power down or sleep mode. Clocking circuitry 230 may then continue applying clock signal 234 to module 214 and applying clock signal 236 with substantially the same frequency as clock signal 234 to shared portion 224 to allow module 214 to access shared portion 224. Similarly, clocking circuitry 230 may halt clock signal 234 and continue applying clock signal 232 to module 212 and applying clock signal 236 with substantially the same frequency as clock signal 232 to shared portion 224.

Figure 4:
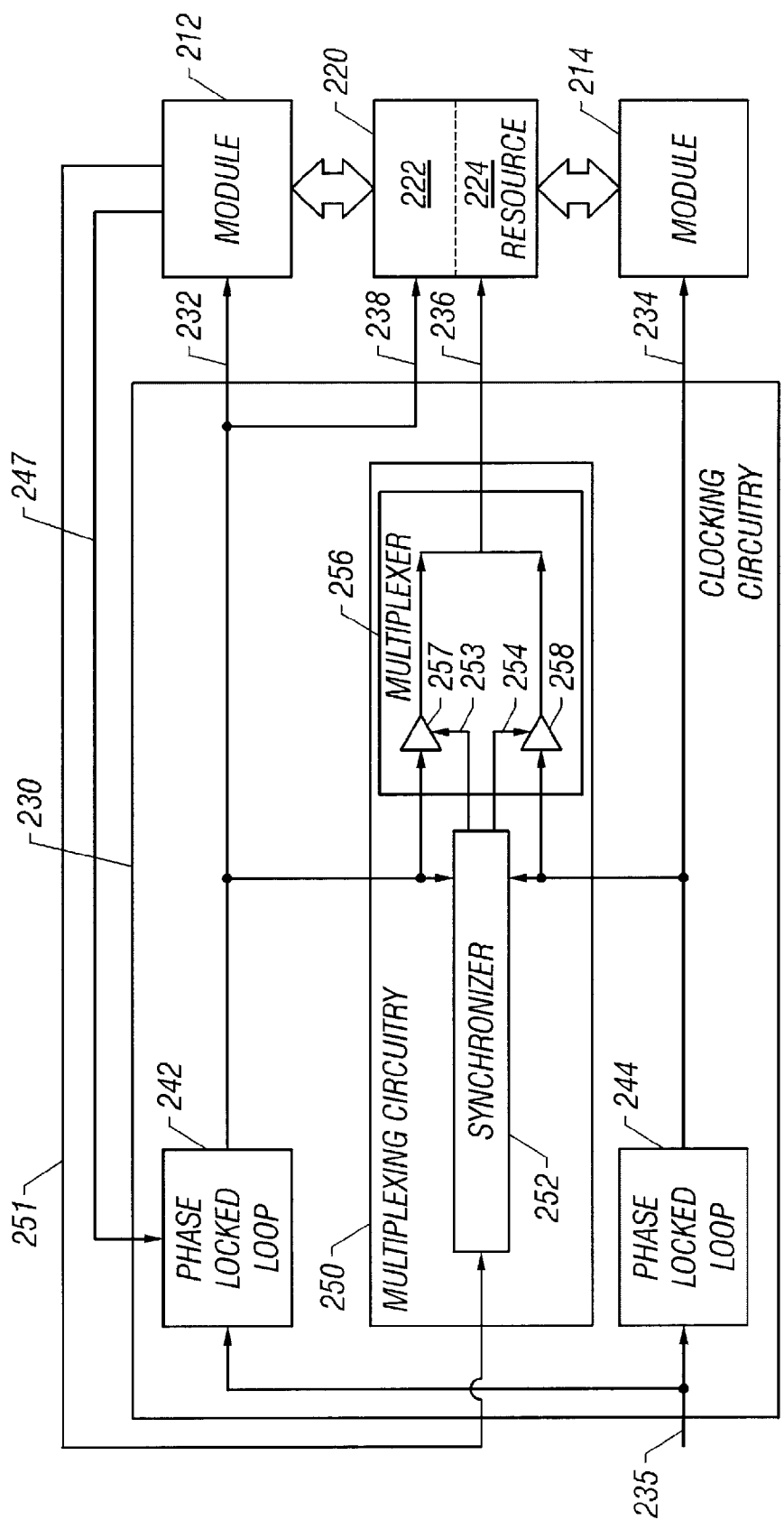
FIG. 4 illustrates, for one embodiment, clocking circuitry for the integrated circuit chip of FIG. 2.

Clocking circuitry 230 may comprise any suitable circuitry to generate and output clock signals 232, 234, 236, and 238 in any suitable manner. For one embodiment, as illustrated in FIG. 4, clocking circuitry 230 comprises a phase locked loop 242, a phase locked loop 244, and multiplexing circuitry 250.

Phase locked loop 242 receives a system clock signal 235 and generates and outputs clock signal 232 to module 212. Phase locked loop 244 also receives system clock signal 235 and generates and outputs clock signal 234 to module 214. Phase locked loops 242 and 244 may receive system clock signal 235 from any suitable source. Although described as receiving the same system clock signal 235, phase locked loops 242 and 244 for another embodiment may each receive a respective system clock signal at any suitable frequency from a separate source. Phase locked loops 242 and 244 for one embodiment receive system clock signal 235 having a predetermined frequency and generate and output clock signals 232 and 234, respectively, with clock frequencies each higher than that of system clock signal 235. Although described as comprising phase locked loops 242 and 244, clocking circuitry 230 for other embodiments may comprise any other suitable circuitry to generate and output clock signals 232 and 234. A single phase locked loop, for example, may be used to generate and output both clock signals 232 and 234.

Clocking circuitry 230 for one embodiment receives a clock enable signal 247 indicating whether clocking circuitry 230 is to generate and output clock signal 232 or halt clock signal 232. For one embodiment, as illustrated in FIG. 4, phase locked loop 242 receives clock enable signal 247 and selectively generates and outputs clock signal 232 based on clock enable signal 247. Clocking circuitry 230 may receive clock enable signal 247 from any suitable source. For one embodiment, as illustrated in FIG. 4, module 212 may generate and output clock enable signal 247 to clocking circuitry 230. Module 212 may generate and output clock enable signal 247 to halt clock signal 232, for example, when module 212 enters an internal power down or sleep mode. For another embodiment where clocking circuitry 230 generates and outputs a plurality of clock signals 232 over separate lines each to a separate portion of module 212, for example, module 212 may selectively enable and disable one or more clock signals 232 to module 212 using one or more clock enable signals 247. In this manner, module 212 may disable one or more clock signals 232 while one or more clock signals 232 continue to drive one or more portions that generate and output a clock enable signal 247.

Multiplexing circuitry 250 generates and outputs clock signal 236 to at least shared portion 224 of resource 220 and may comprise any suitable circuitry to generate and output clock signal 236 in any suitable manner. Multiplexing circuitry 250 for one embodiment receives a shared mode signal 251 indicating whether multiplexing circuitry 250 is to generate clock signal 236 with substantially the same frequency as clock signal 232 or clock signal 234. Multiplexing circuitry 250 for one embodiment also receives clock signal 232 and clock signal 234 and outputs either clock signal 232 or clock signal 234 as clock signal 236 based on shared mode signal 251.

Multiplexing circuitry 250 may receive shared mode signal 251 from any suitable source. For one embodiment, as illustrated in FIG. 4, module 212 may generate and output shared mode signal 251 to multiplexing circuitry 250. For another embodiment, module 214 may generate and output shared mode signal 251 to multiplexing circuitry 250. For yet another embodiment, module 212 and module 214 can each generate and output a shared mode signal to multiplexing circuitry 250, and multiplexing circuitry 250 may generate and output clock signal 236 based on each such shared mode signal.

For one embodiment, as illustrated in FIG. 4, multiplexing circuitry 250 comprises a synchronizer 252 and a multiplexer 256.

Synchronizer 252 receives shared mode signal 251 and generates and outputs to multiplexer 256 module select signals 253 and 254 based on shared mode signal 251. Module select signal 253 indicates whether clock signal 236 is to have substantially the same frequency as clock signal 232. Module select signal 254 indicates whether clock signal 236 is to have substantially the same frequency as clock signal 234. Synchronizer 252 may comprise any suitable circuitry to generate and output module select signals 253 and 254 in any suitable manner. For one embodiment, as illustrated in FIG. 4, synchronizer 252 receives clock signals 232 and 234 to time the generation and output of module select signals 253 and 254. For another embodiment, synchronizer 252 may receive only clock signal 232 or 234 to time the generation and output of module select signals 253 and 254.

Multiplexer 256 receives clock signals 232 and 234 and selectively outputs clock signal 232 or clock signal 234 as clock signal 236 based on module select signals 253 and 254. Multiplexer 256 may comprise any suitable circuitry to output clock signal 236 in any suitable manner. Multiplexer 256 for one embodiment, as illustrated in FIG. 4, comprises tri-state drivers 257 and 258. Driver 257 receives clock signal 232 and is enabled by module select signal 253 to output clock signal 232 as clock signal 236. Driver 258 receives clock signal 234 and is enabled by module select signal 254 to output clock signal 234 as clock signal 236.

Figure 5:
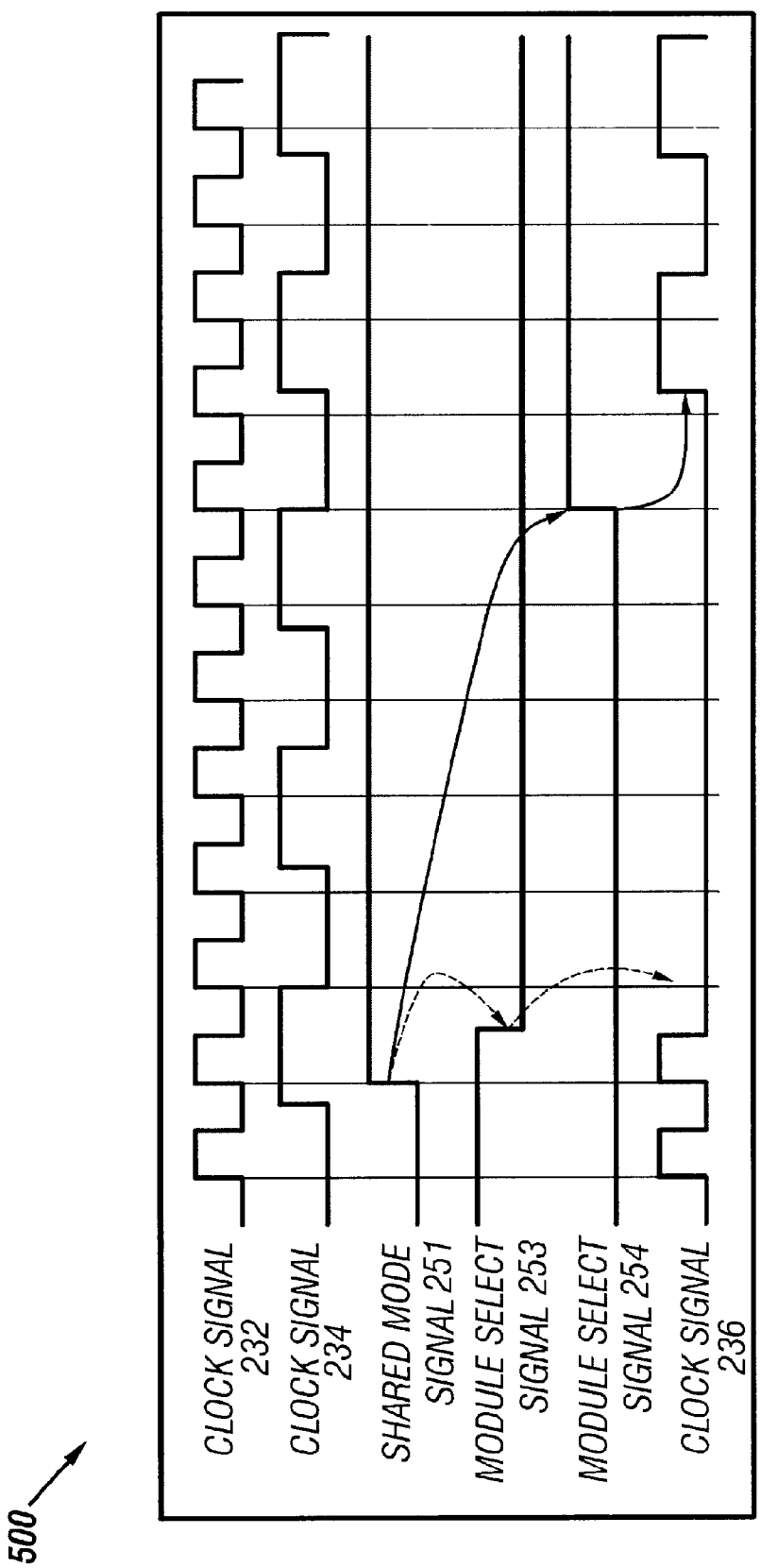
FIG. 5 illustrates, for one embodiment, a timing diagram for shared resource clock multiplexing from the first module to the second module of FIG. 2.

FIG. 5 illustrates, for one embodiment, a timing diagram 500 for multiplexing circuitry 250 to switch access to shared portion 224 of resource 220 from module 212 to module 214.

As illustrated in FIG. 5, module 212 switches shared mode signal 251 at a rising edge of clock signal 232 from a logic low level, indicating module 212 is to access shared portion 224, to a logic high level, indicating module 214 is to access shared portion 224. In response, synchronizer 252 switches module select signal 253 at or following a following falling edge of clock signal 232 from a logic high level, enabling driver 257 to output clock signal 232 as clock signal 236, to a logic low level, disabling driver 257. Synchronizer 252 also switches module select signal 254 at or following a following falling edge of clock signal 234 from a logic low level, disabling driver 258, to a logic high level, enabling driver 258 to output clock signal 234 as clock signal 236.

Synchronizer 252 for one embodiment switches module select signal 254 after an optional predetermined delay period following the switching of shared mode signal 251 or the switching of module select signal 253. In this manner, synchronizer 252 stops application of clock signal 236 to shared portion 224 as clock signal 236 is switched. Stopping application of clock signal 236 as clock signal 236 is switched may help to prevent any glitches or metastability conditions, to allow shared portion 224 to stabilize before clock signal 236 is switched, and to account for the asynchronous transition of shared mode signal 251 relative to each clock signal 232 and 234. Synchronizer 252 may comprise any suitable circuitry, such as a plurality of flip-flops for example, to delay switching module select signal 254.

Figure 6:
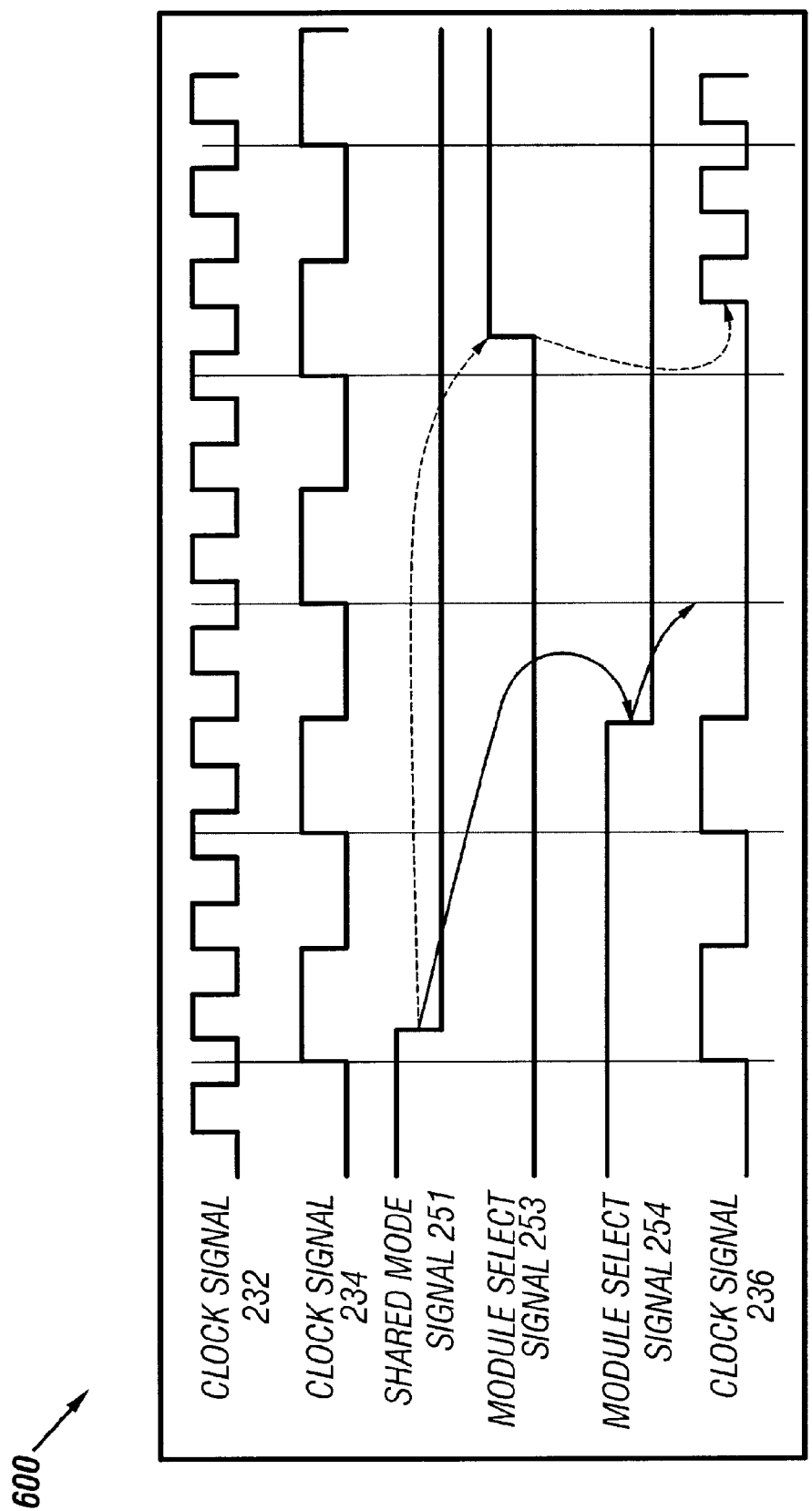
FIG. 6 illustrates, for one embodiment, a timing diagram for shared resource clock multiplexing from the second module to the first module of FIG. 2.

FIG. 6 illustrates, for one embodiment, a timing diagram 600 for multiplexing circuitry 250 to switch access to shared portion 224 of resource 220 from module 214 to module 212.

As illustrated in FIG. 6, module 212 switches shared mode signal 251 at a rising edge of clock signal 232 from a logic high level, indicating module 214 is to access shared portion 224, to a logic low level, indicating module 212 is to access shared portion 224. In response, synchronizer 252 switches module select signal 254 at or following a following falling edge of clock signal 234 from a logic high level, enabling driver 258 to output clock signal 234 as clock signal 236, to a logic low level, disabling driver 258. Synchronizer 252 also switches module select signal 253 at or following a following falling edge of clock signal 232 from a logic low level, disabling driver 257, to a logic high level, enabling driver 257 to output clock signal 232 as clock signal 236.

Synchronizer 252 for one embodiment switches module select signal 253 after an optional predetermined delay period following the switching of shared mode signal 251 or the switching of module select signal 254. In this manner, as with switching access to shared portion 224 from module 212 to module 214, synchronizer 252 stops application of clock signal 236 to shared portion 224 as clock signal 236 is switched. Synchronizer 252 may comprise any suitable circuitry, such as a plurality of flip-flops for example, to delay switching module select signal 253.

Although described in connection with timing diagrams 500 and 600, multiplexing circuitry 250 may be designed to operate in accordance with any suitable timing diagram to generate and output clock signal 236. For other embodiments, for example, synchronizer 252 and multiplexer 256 may generate and output clock signal 236 based on an active logic low shared mode signal 251, module select signal 253, and/or module select signal 254. The timing to switch signals from logic high to logic low and/or from logic low to logic high may also be modified in any suitable manner.

Synchronizer 252 and multiplexer 256 for other embodiments may comprise other suitable circuitry to generate and output clock signal 236. As one example, synchronizer 252 may comprise suitable circuitry to generate and output only a single module select signal to multiplexer 256 based on shared mode signal 251. Multiplexer 256 may comprise suitable circuitry to both enable driver 257 or 258 and disable the other driver 257 or 258 based on such a single module select signal. As another example, multiplexer 256 may receive shared mode signal 251 directly and may comprise suitable circuitry to both enable driver 257 or 258 and disable the other driver 257 or 258 based on shared mode signal 251.

Although described as selectively applying clock signal 232 or clock signal 234 as clock signal 236, multiplexing circuitry 250 for another embodiment may receive another clock signal having substantially the same frequency as clock signal 232 and/or another clock signal having substantially the same frequency as clock signal 234 and may selectively apply such other clock signals as clock signal 236. Multiplexing circuitry 250 may receive such other clock signals from any suitable source.

Clocking circuitry 230 for one embodiment, as illustrated in FIG. 4, outputs clock signal 232 as clock signal 238 to at least portion 222 of resource 220. Clocking circuitry 220 for another embodiment may generate and output another clock signal having substantially the same frequency as clock signal 232 as clock signal 238.

Modules 212 and 214 may each comprise any suitable circuitry to implement any suitable module, such as a processor or graphics engine for example. Resource 220 may comprise any suitable circuitry to implement any suitable resource, such as a memory for example. Integrated circuit chip 210 may be used in any suitable computer system.

Figure 7:
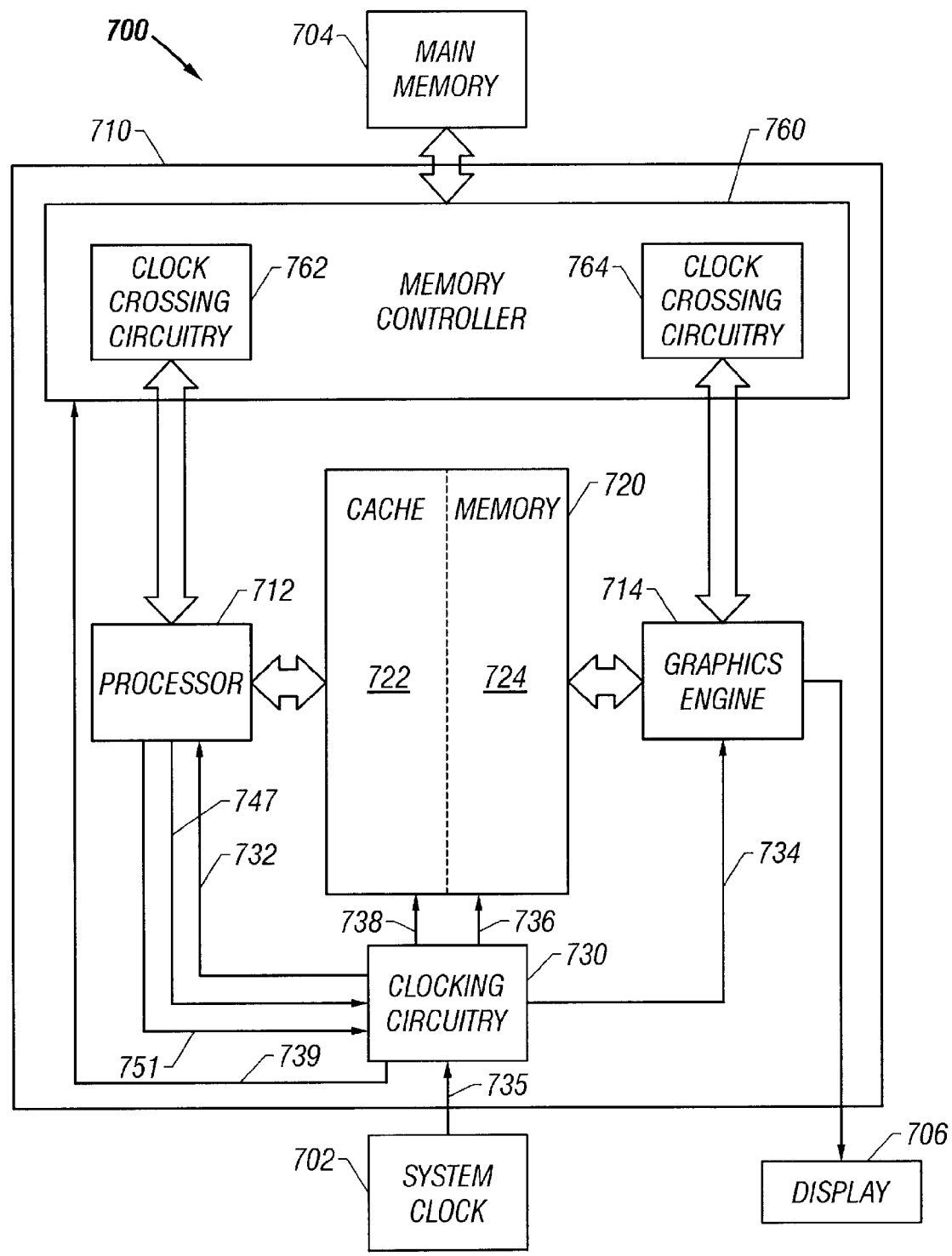
FIG. 7 illustrates, for one embodiment, a computer system comprising an integrated circuit chip in which a cache memory is shared between a processor and a graphics engine.

FIG. 7 illustrates, for one embodiment, a computer system 700 comprising a system clock 702, a main memory 704, a display 706, and an integrated circuit chip 710. Integrated circuit chip 710 corresponds to integrated circuit chip 210.

Integrated circuit chip 710 comprises a processor 712, a graphics engine 714, a cache memory 720, clocking circuitry 730, and memory controller 760. Processor 712 corresponds to module 212. Graphics engine 714 corresponds to module 214. Cache memory 720 corresponds to resource 220. Clocking circuitry 730 corresponds to clocking circuitry 230.

Processor 712 may comprise any suitable processor architecture and for one embodiment comprise an Intel® Architecture used, for example, in the Pentium® III family of processors available from Intel® Corporation of Santa Clara, Calif. Graphics engine 714 controls the rendering and/or display of information on display 706. Display 706 is coupled to graphics engine 714. Any suitable display, such as a cathode ray tube (CRT) or liquid crystal display (LCD) for example, may be used for display 706.

Processor 712 and graphics engine 714 share access to at least a portion of cache memory 720. Cache memory 720 may comprise any suitable memory. Cache memory 720 for one embodiment, as illustrated in FIG. 7, comprises a first portion 722 and a second shared portion 724, and processor 712 and graphics engine 714 share access to shared portion 724.

Clocking circuitry 730 is coupled to receive a system clock signal 735 from system clock 702 and drives processor 712 with a clock signal 732, graphics engine 714 with a clock signal 734, and memory controller 760 with a clock signal 739 based on system clock signal 735. Clocking circuitry 730 generates and outputs clock signal 732 to processor 712 or halts clock signal 732 based on a clock enable signal 747. Clocking circuitry 730 also drives at least shared portion 724 with a clock signal 736 and at least portion 722 with a clock signal 738 based on system clock signal 735 and based on a shared mode signal 751.

System clock signal 735 corresponds to system clock signal 235. System clock 702 may comprise any suitable circuit components to generate and output system clock signal 735. Clock signals 732, 734, 736, and 738 correspond to clock signals 232, 234, 236, and 238, respectively. Clock enable signal 747 corresponds to clock enable signal 247. Shared mode signal 751 corresponds to shared mode signal 251.

Memory controller 760 is coupled to processor 712, graphics memory 714, and main memory 704 and controls access to main memory 704 for processor 712 and graphics engine 714. Main memory 704 stores data and/or instructions, for example, for computer system 700 and may comprise any suitable memory, such as a dynamic random access memory (DRAM) for example.

For one embodiment where memory controller 760 is driven by clock signal 739 at a frequency different from that of clock signal 732, processor 712 accesses memory controller 760 using clock crossing circuitry 762 to help manage the cross-over of data and control signals, for example, between memory controller 760 and processor 712. For one embodiment where memory controller 760 is driven by clock signal 739 at a frequency different from that of clock signal 734, graphics engine 714 accesses memory controller 760 using clock crossing circuitry 764 to help manage the cross-over of data and control signals, for example, between memory controller 760 and graphics engine 714.

Clocking circuitry 730 may drive processor 712, graphics engine 714, and memory controller 760 at any suitable frequency. Clocking circuitry 730 may, for example, drive processor 712 at a frequency from approximately 1000 MegaHertz (MHz) to approximately 1600 MHz, graphics engine 714 at a frequency from approximately 300 MHz to approximately 400 MHz, and memory controller 760 at a frequency from approximately 133 MHz to approximately 266 MHz.

Processor 712 and/or graphics engine 714 use cache memory 720 to help maintain a steady supply of instructions and/or data for processor 712 and/or graphics engine 714. Cache memory 720 stores instructions and/or data accessed from main memory 704 through memory controller 760 for processing by processor 712 and/or graphics engine 714. Cache memory 720 may also store recently and/or frequently used instructions and/or data. For one embodiment, as illustrated in FIG. 7, where cache memory 720 comprises at least another portion 722 in addition to shared portion 724, processor 712 may access instructions and/or data in portion 722 and/or shared portion 724, and graphics engine 714 may access instructions and/or data in shared portion 724. Cache memory 720 may store instructions and/or data in accordance with any suitable caching scheme.

Integrating processor 712, cache memory 720, and graphics engine 714 on integrated circuit chip 710 allows processor 712 and graphics engine 714 to share cache memory 720. As processors typically have their own relatively larger cache memory to improve their performance and graphics engines typically have their own relatively smaller texture and render caches to improve their performance, allowing graphics engine 714 to use shared portion 724 of cache memory 720 as texture and/or render caches, for example, helps improve system performance as graphics engine 714 may use relatively more cache space.

Figure 8:
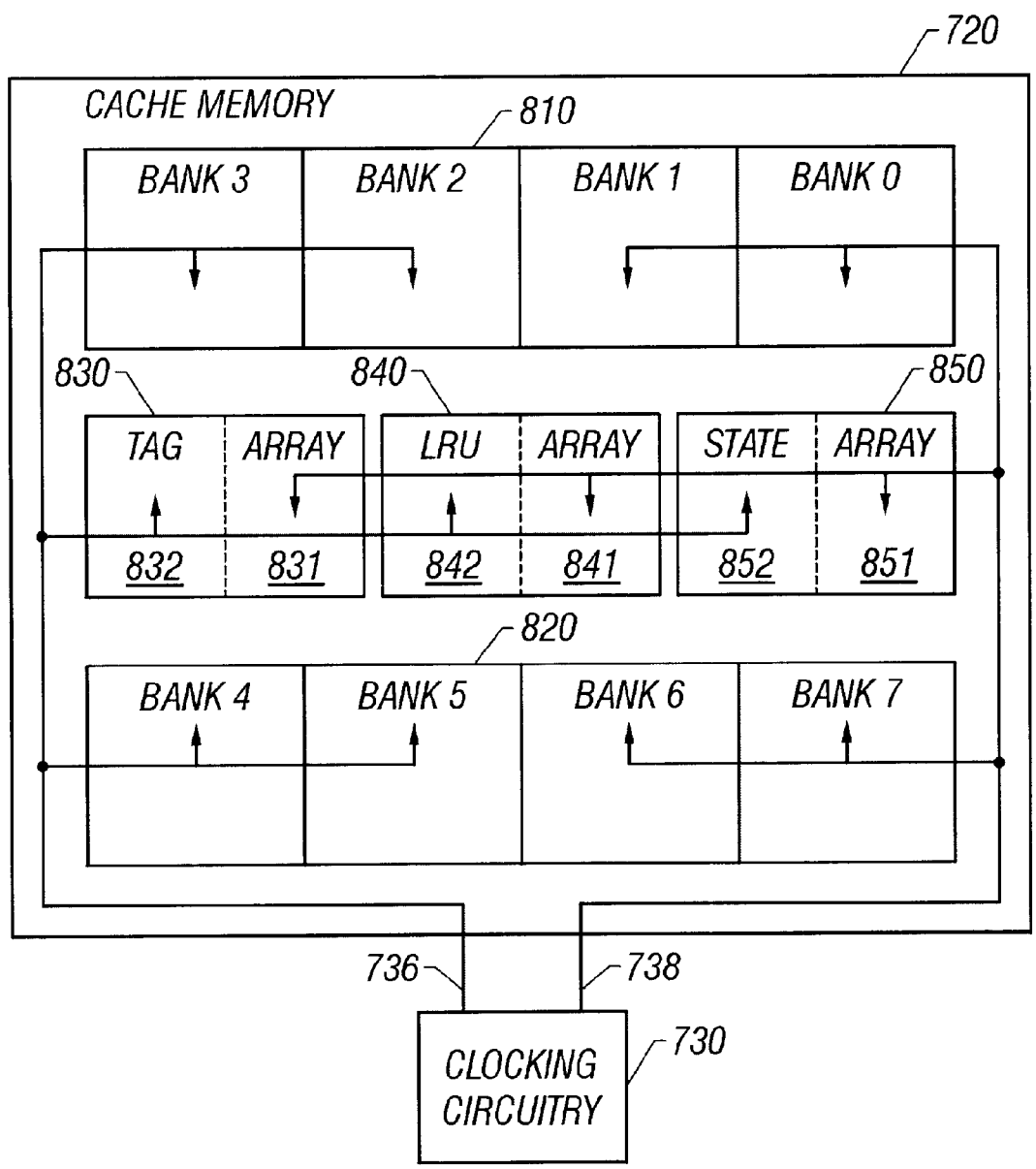
FIG. 8 illustrates, for one embodiment, a shared cache memory with clock multiplexing at a global level.

As illustrated in FIG. 8, cache memory 720 for one embodiment comprises one set 810 of four banks 0–3, another set 820 of four banks 4–7, a tag array 830, a least recently used (LRU) array 840, and a state array 850. Where cache memory 720 comprises at least another portion 722 in addition to shared portion 724, clocking circuitry 730 for one embodiment drives banks 0 and 1 of set 810, banks 6 and 7 of set 820, a corresponding portion 831 of tag array 830, a corresponding portion 841 of LRU array 840, and a corresponding portion 851 of state array 850 with clock signal 738 and drives banks 2 and 3 of set 810, banks 4 and 5 of set 820, a corresponding portion 832 of tag array 830, a corresponding portion 842 of LRU array 840, and a corresponding portion 852 of state array 850 with clock signal 736.

Rather than performing clock multiplexing at a global level as illustrated in FIGS. 2, 4, 7, and 8, clocking circuitry 230 and/or 730 for another embodiment may perform clock multiplexing at a plurality of clock taps for resource 220 and/or cache memory 720, respectively.

Figure 9:
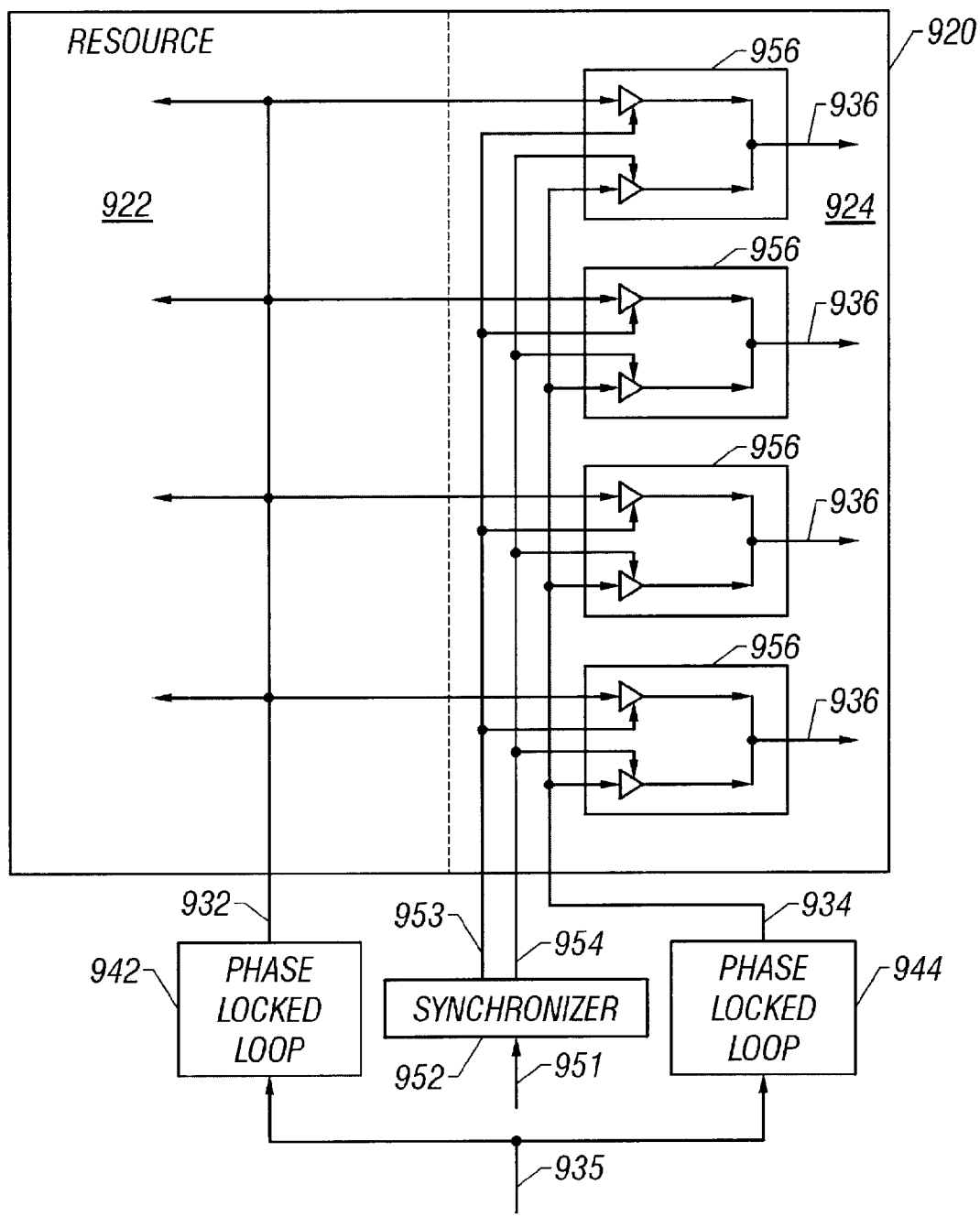
FIG. 9 illustrates, for one embodiment, a shared resource with clock multiplexing at a plurality of clock taps.

FIG. 9 illustrates, for one embodiment, clocking circuitry comprising a phase locked loop 942, a phase locked loop 944, a synchronizer 952, and a plurality of multiplexers 956 to drive at least a shared portion 924 of a resource 920. Resource 920 for one embodiment also comprises another portion 922.

Resource 920, portion 922, and shared portion 924 correspond to resource 220, portion 222, and shared portion 224, respectively. Phase locked loop 942, phase locked loop 944, and synchronizer 952 correspond to phase locked loop 242, phase locked loop 244, and synchronizer 252, respectively. Each multiplexer 956 corresponds to multiplexer 256.

Phase locked loop 942 is coupled to receive a system clock signal 935 and generate and output a clock signal 932 to portion 922 and each multiplexer 956. Phase locked loop 944 is also coupled to receive system clock signal 935 and generate and output a clock signal 934 to each multiplexer 956. Clock signal 932, clock signal 934, and system clock signal 935 correspond to clock signal 232, clock signal 234, and system clock signal 235, respectively.

Synchronizer 952 is coupled to receive a shared mode signal 951 and generates and outputs module select signals 953 and 954 to each multiplexer 956 based on shared mode signal 951. Module select signals 953 and 954 and shared mode signal 951 correspond to module select signals 253 and 254 and shared mode signal 251, respectively. Each multiplexer 256 receives clock signals 932 and 934 and selectively outputs clock signal 932 or clock signal 934 as a clock signal 936 to a respective clock tap for at least shared portion 924 of resource 920 based on module select signals 953 and 954. Each clock signal 936 corresponds to clock signal 236.

Performing clock multiplexing at a plurality of clock taps for resource 920 may help to avoid or minimize any clock skew conditions otherwise associated with global level clock multiplexing.

Figure 10:
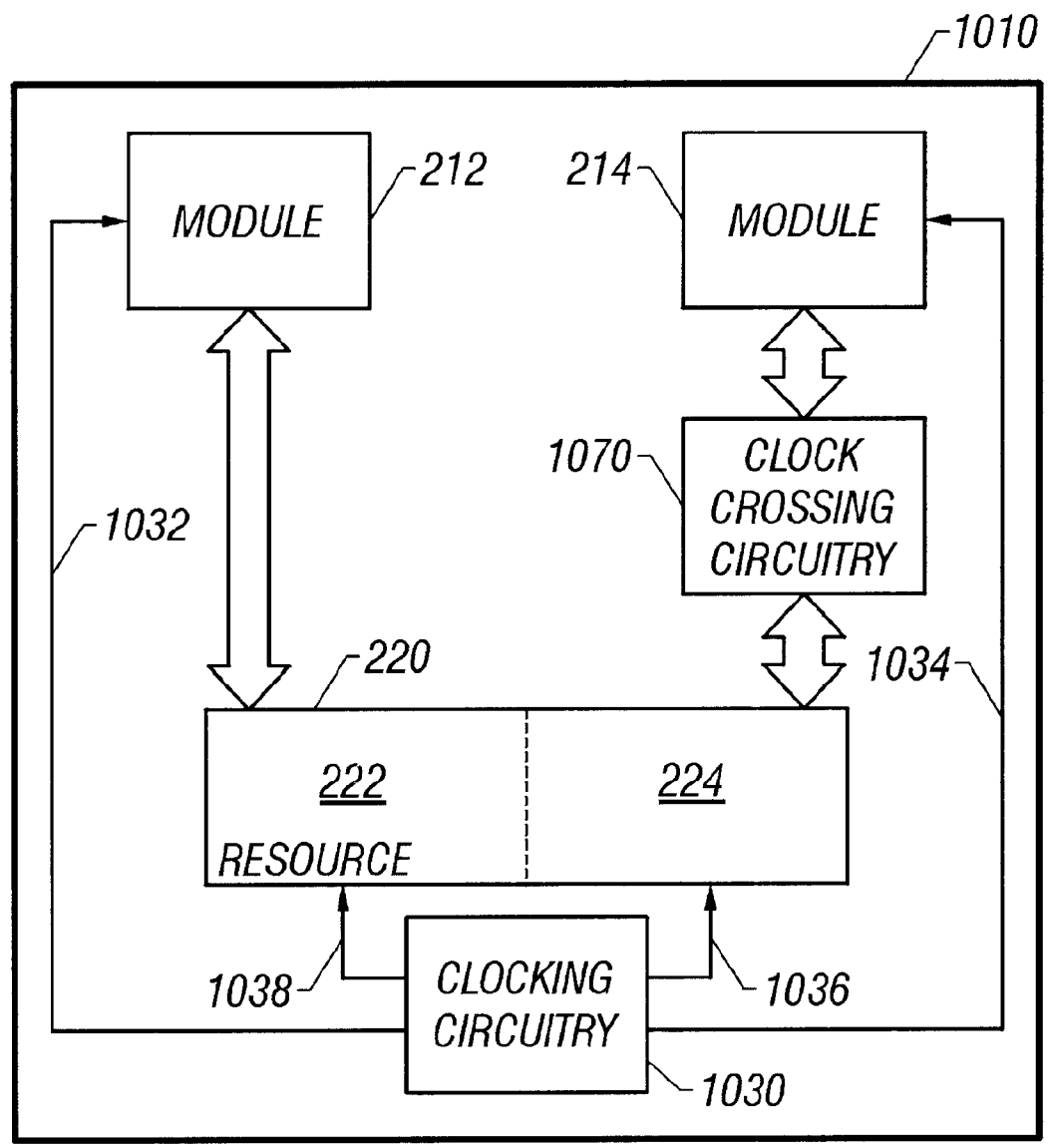
FIG. 10 illustrates, for another embodiment, an integrated circuit chip in which a resource is shared between a first module and a second module.

FIG. 10 illustrates, for another embodiment, an integrated circuit chip 1010 similar to integrated circuit chip 210 of FIG. 2. Integrated circuit chip 1010 comprises clocking circuitry 1030 corresponding to clocking circuitry 230. Clocking circuitry 1030 generates and outputs clock signals 1032, 1034, 1036, and 1038 corresponding to clock signals 232, 234, 236, and 238, respectively. Integrated circuit chip 1010 also comprises clock crossing circuitry 1070 to allow shared portion 224 of resource 220 to be driven by clock signal 1036 at a frequency that is greater or less than the frequency of clock signal 1034 driving module 214.

Clocking circuitry 1030 may generate and output clock signals 1034 and 1036 at any suitable frequency. Clocking circuitry 1030 for one embodiment selectively generates and outputs clock signal 1036 at a frequency that is a multiple, such as two for example, of the frequency of clock signal 1034. In this manner, clock crossing circuitry 1070 may be implemented in a relatively simple manner, and integrated circuit chip 1010 may leverage additional performance as resource 220 may be accessed at a higher frequency. Clocking circuitry 1030 may, for example, generate and output clock signal 1034 at a frequency from approximately 300 MHz to approximately 400 MHz and clock signal 1036 at a frequency from approximately 600 MHz to approximately 800 MHz.

Clock crossing circuitry 1070 for one embodiment may also be double-pumped to better exploit the relatively faster access rate for resource 220.

Clocking circuitry 1030 may generate and output clock signals 1032, 1034, 1036, and 1038 in any suitable manner. For one embodiment, clocking circuitry 1030 may be implemented by modifying clocking circuitry 230 as illustrated in FIG. 4 such that phase locked loop 244 generates and outputs clock signal 234 to module 214 and another separate clock signal to multiplexing circuitry 250.

Although described in the context of enabling two modules to share one portion of a resource, the present invention may be extended to enable two or more modules to share access to at least a portion of a resource or to share access to more than one portion of a resource in a selective manner. The resource may be apportioned, if at all, into any suitable number of portions of any suitable size or fraction of the resource. Suitable clocking circuitry may be used to drive any such portion with a clock signal to enable that portion to be accessed by only one module or to selectively drive any such portion with a clock signal to allow that portion to be shared between or among more than one module.

As one example, clocking circuitry 230 may comprise suitable circuitry to selectively apply clock signal 238 with substantially the same frequency as clock signal 232 or clock signal 234 to drive at least portion 222 of resource 220 to allow module 212 or module 214, respectively, to access portion 222 of resource 220.

As another example, clocking circuitry 230 may comprise suitable circuitry to selectively apply clock signal 236 with substantially the same frequency as clock signal 232, clock signal 234, or another clock signal driving another module to drive at least portion 224 of resource 220 to allow module 212, module 214, or the other module, respectively, to access portion 224 of resource 220.

Although described in the context of two modules and a resource integrated on the same integrated circuit chip, the present invention may be extended to enable resource sharing between or among two or more modules in a system implemented on more than one integrated circuit.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
    applying a first clock signal having a first frequency to drive a first module;
    applying a second clock signal having a second frequency to drive a second module, wherein the second frequency is different from the first frequency;
    selectively applying a third clock signal with a frequency substantially the same as the first frequency to drive at least one portion of a resource to allow the first module to access the one portion of the resource and with a frequency substantially the same as the second frequency to drive at least the one portion of the resource to allow the second module to access the one portion of the resource; and applying a fourth clock signal with a frequency substantially the same as the first frequency to drive at least another portion of the resource to allow the first module to access the other portion.

2. The method of claim 1, wherein the selectively applying comprises applying the third clock signal with a frequency substantially the same as the second frequency to drive at least the one portion of the resource while the fourth clock signal is applied to drive at least the other portion of the resource.

3. The method of claim 1, comprising halting the first clock signal while applying the third clock signal with a frequency substantially the same as the second frequency to drive at least the one portion of the resource.

4. An apparatus comprising:
a resource comprising at least one portion and an other portion;
a first module to access at least the one port on of the resource;
a second module to access at least the one portion of the resource; and
clocking circuitry coupled to drive the first module with a first clock signal having a first frequency, coupled to drive the second module with a second clock signal having a second frequency different from the first frequency, and coupled to drive at least the one portion of the resource selectively with a third clock signal with a frequency substantially the same as the first frequency and with a frequency substantially the same as the second frequency; and
further wherein the clocking circuitry is coupled to drive at least the other portion of the resource with a fourth clock signal with a frequency substantially the same as the first frequency.

5. The apparatus of claim 4, wherein the clocking circuitry drives at least the one portion of the resource with the third clock signal with a frequency substantially the same as the second frequency while driving at least the other portion of the resource with the fourth clock signal.

6. The apparatus of claim 4, wherein the clocking circuitry halts the first clock signal while driving at least the one portion of the resource with the third clock signal with a frequency substantially the same as the second frequency.

7. The apparatus of claim 4, wherein the clocking circuitry comprises a multiplexer to output the first clock signal or the second clock signal selectively as the third clock signal to at least the one portion of the resource.

8. The apparatus of claim 4, wherein the clocking circuitry comprises a first phase locked loop to generate the first clock signal and a second phase locked loop to generate the second clock signal.

9. The apparatus of claim 4, wherein the resource comprises a memory.

10. An apparatus comprising:
a resource comprising at least one portion;
a first module to access at least the one port on of the resource;
a second module to access at least the one portion of the resource; and
clocking circuitry coupled to drive the first module with a first clock signal having a first frequency, coupled to drive the second module with a second clock signal having a second frequency different from the first frequency, and coupled to drive at least the one portion of the resource selectively with a third clock signal with a frequency substantially the same as the first frequency and with a frequency substantially the same as the second frequency; and
wherein the clocking circuitry comprises a plurality of multiplexers each to output the first clock signal or the second clock signal selectively as the third clock signal to a respective clock tap of the resource.

11. An apparatus comprising:
a resource comprising at least one portion;
a first module to access at least the one port on of the resource;
a second module to access at least the one portion of the resource, wherein the first module, the second module, and the resource are integrated on one chip; and
clocking circuitry coupled to drive the first module with a first clock signal having a first frequency, coupled to drive the second module with a second clock signal having a second frequency different from the first frequency, and coupled to drive at least the one portion of the resource selectively with a third clock signal with a frequency substantially the same as the first frequency and with a frequency substantially the same as the second frequency.

12. An apparatus comprising:
a resource comprising at least one portion;
a first module to access at least the one port on of the resource, wherein the first module comprises a processor and the second module comprises a graphics engine;
a second module to access at least the one portion of the resource; and
clocking circuitry coupled to drive the first module with a first clock signal having a first frequency, coupled to drive the second module with a second clock signal having a second frequency different from the first frequency, and coupled to drive at least the one portion of the resource selectively with a third clock signal with a frequency substantially the same as the first frequency and with a frequency substantially the same as the second frequency.

13. An integrated circuit chip comprising:
a cache memory comprising at least one portion;
a processor to access at least the one portion of the cache memory;
a graphics engine to access at least the one portion of the cache memory; and
clocking circuitry coupled to drive the processor with a first clock signal having a first frequency, coupled to drive the graphics engine with a second clock signal having a second frequency different from the first frequency, and coupled to drive at least the one portion of the cache memory selectively with a third clock signal with a frequency substantially the same as the first frequency and with a frequency substantially the same as the second frequency.

14. The integrated circuit chip of claim 13, wherein the cache memory comprises at least the one portion and another portion; and
wherein the clocking circuitry is coupled to drive at least the other portion of the cache memory with a fourth clock signal with a frequency substantially the same as the first frequency.

15. The integrated circuit chip of claim 14, wherein the clocking circuitry drives at least the one portion of the cache memory with the third clock signal with a frequency substantially the same as the second frequency while driving at least the other portion of the cache memory with the fourth clock signal.

16. The integrated circuit chip of claim 13, wherein the clocking circuitry halts the first clock signal while driving at least the one portion of the cache memory with the third clock signal with a frequency substantially the same as the second frequency.

17. The integrated circuit chip of claim 13, wherein the clocking circuitry comprises a multiplexer to output the first clock signal or the second clock signal selectively as the third clock signal to at least the one portion of the cache memory.

18. The integrated circuit chip of claim 13, wherein the clocking circuitry comprises a plurality of multiplexers each to output the first clock signal or the second clock signal selectively as the third clock signal to a respective clock tap of the cache memory.

19. The integrated circuit chip of claim 13, wherein the clocking circuitry comprises a first phase locked loop to generate the first clock signal and a second phase locked loop to generate the second clock signal.

20. A computer system comprising:
   (a) a main memory;
   (b) a system clock; and
   (c) an integrated circuit chip comprising:
      (i) a cache memory comprising at least one portion,
      (ii) a processor to access at least the one portion of the cache memory,
      (iii) a graphics engine to access at least the one portion of the cache memory,
      (iv) clocking circuitry coupled to the system clock, the clocking circuitry coupled to drive the processor with a first clock signal having a first frequency, coupled to drive the graphics engine with a second clock signal having a second frequency different from the first frequency, and coupled to drive at least the one portion of the cache memory selectively with a third clock signal with a frequency substantially the same as the first frequency and with a frequency substantially the same as the second frequency, and
      (v) a memory controller coupled to the processor, to the graphics engine, and to the main memory to control access to the main memory.

21. The computer system of claim 20, wherein the cache memory comprises at least the one portion and another portion; and
   wherein the clocking circuitry is coupled to drive at least the other portion of the cache memory with a fourth clock signal with a frequency substantially the same as the first frequency.

22. The computer system of claim 20, wherein the clocking circuitry comprises a multiplexer to output the first clock signal or the second clock signal selectively as the third clock signal to at least the one portion of the cache memory.

23. An apparatus comprising:
   a resource comprising at least one portion;
   a first module to access at least the one portion of the resource;
   a second module to access at least the one resource;
   clocking circuitry coupled to drive the first module with a first clock signal having a first frequency, coupled to drive the second module with a second clock signal having a second frequency different from the first frequency, and coupled to drive at least the one portion of the resource selectively with a third clock signal with frequency substantially the same as the first frequency and with a third frequency different from the first frequency and from the second frequency; and
   clock crossing circuitry coupled to the second module and to the resource to allow the second module to access the resource while the clocking circuitry drives the resource with the third clock signal with the third frequency.

24. The apparatus of claim 23, wherein the resource comprises at least the one portion and another portion; and
   wherein the clocking circuitry is coupled to drive at least the other portion of the resource with a fourth clock signal with a frequency substantially the same as the first frequency.

25. The apparatus of claim 24, wherein the clocking circuitry drives at least the one portion of the resource with the third clock signal with the third frequency while driving at least the other portion of the cache memory with the fourth clock signal.

26. The apparatus of claim 23, wherein the clocking circuitry halts the first clock signal while driving at least the one portion of the resource with the third clock signal with the third frequency.

27. The apparatus of claim 23, wherein the clocking circuitry comprises a multiplexer to output the first clock signal or another clock signal having the third frequency selectively as the third clock signal to at least the one portion of the source.

28. The apparatus of claim 23, wherein the firs module comprises a processor, the second module comprises a graphics engine, and the resource comprises a memory; and
   wherein the first module, the second module, and the resource are integrated on one chip.

* * * * *